US011044649B2

(12) United States Patent
Martin et al.

(10) Patent No.: US 11,044,649 B2
(45) Date of Patent: Jun. 22, 2021

(54) TRANSMISSION OF UPLINK REFERENCE SIGNALLING ACCORDING TO DIFFERENT UPLINK REFERENCE SIGNALLING CONFIGURATIONS

(71) Applicants: Sony Corporation, Tokyo (JP); Sony Mobile Communications Inc., Tokyo (JP)

(72) Inventors: Brian Alexander Martin, Basingstoke (GB); Shin Horng Wong, Basingstoke (GB); Martin Warwick Beale, Basingstoke (GB); Yuxin Wei, Basingstoke (GB); Vivek Sharma, Basingstoke (GB); Shinichiro Tsuda, Basingstoke (GB); Hideji Wakabayashi, Basingstoke (GB); Anders Berggren, Lund (SE)

(73) Assignees: SONY CORPORATION, Tokyo (JP); SONY MOBILE COMMUNICATIONS, INC., Tokyo (JP)

( * ) Notice: Subject to any disclaimer, the term of this patent is extended or adjusted under 35 U.S.C. 154(b) by 49 days.

(21) Appl. No.: 16/476,300

(22) PCT Filed: Dec. 14, 2017

(86) PCT No.: PCT/EP2017/082858
§ 371 (c)(1),
(2) Date: Jul. 8, 2019

(87) PCT Pub. No.: WO2018/130366
PCT Pub. Date: Jul. 19, 2018

(65) Prior Publication Data
US 2020/0045690 A1    Feb. 6, 2020

(51) Int. Cl.
*H04W 36/00* (2009.01)
*H04W 72/04* (2009.01)
(Continued)

(52) U.S. Cl.
CPC .... *H04W 36/0085* (2018.08); *H04W 36/0083* (2013.01); *H04W 36/0094* (2013.01);
(Continued)

(58) Field of Classification Search
CPC ......... H04W 36/0083; H04W 36/0094; H04W 72/0413; H04W 68/00
See application file for complete search history.

(56) References Cited

U.S. PATENT DOCUMENTS

2003/0186684 A1* 10/2003 Kearney ............... H04W 68/02
455/411
2008/0175189 A1* 7/2008 Furrer .................. H04B 7/0689
370/328

(Continued)

OTHER PUBLICATIONS

International Search Report and Written Opinion dated Mar. 1, 2018 for PCT/EP2017/082858 filed on Dec. 14, 2017, 16 pages.
(Continued)

*Primary Examiner* — Min Jung
(74) *Attorney, Agent, or Firm* — Xsensus LLP

(57) ABSTRACT

A method of operating network infrastructure equipment in a wireless telecommunications network comprising the network infrastructure equipment and a terminal device, wherein the terminal device is operable to transmit uplink reference signalling to support measurements of radio channel conditions between the terminal device and the network infrastructure equipment, wherein the method comprises: receiving, from the terminal device, uplink reference signalling in accordance with a first uplink reference signalling configuration; determining the terminal device should be configured to transmit uplink reference signalling in accor-
(Continued)

dance with a second uplink reference signalling configuration; and transmitting a paging message for the terminal device, wherein the paging message comprises an indication of an identifier for the terminal device and an indication of the second uplink reference signalling configuration.

19 Claims, 4 Drawing Sheets

(51) Int. Cl.
| | | |
|---|---|---|
| | *H04W 76/11* | (2018.01) |
| | *H04L 5/00* | (2006.01) |
| | *H04W 24/10* | (2009.01) |
| | *H04W 68/00* | (2009.01) |

(52) U.S. Cl.
CPC ....... *H04W 72/0413* (2013.01); *H04L 5/0051* (2013.01); *H04W 24/10* (2013.01); *H04W 68/00* (2013.01); *H04W 68/005* (2013.01); *H04W 76/11* (2018.02)

(56) References Cited

U.S. PATENT DOCUMENTS

| | | | |
|---|---|---|---|
| 2012/0113869 A1 | 5/2012 | Gaal et al. | |
| 2013/0242895 A1 | 9/2013 | Chen et al. | |
| 2015/0327244 A1 | 11/2015 | Pajukoski et al. | |
| 2017/0257907 A1* | 9/2017 | Yu | H04W 36/30 |
| 2018/0132158 A1* | 5/2018 | Tseng | H04W 36/0088 |
| 2018/0351713 A1* | 12/2018 | Wang | H04W 72/0406 |
| 2019/0149297 A1* | 5/2019 | Tamrakar | H04L 5/0051 370/329 |
| 2019/0281441 A1* | 9/2019 | Huang | H04W 68/005 |
| 2020/0107251 A1* | 4/2020 | Chou | H04W 72/042 |
| 2020/0280959 A1* | 9/2020 | Sharma | H04W 52/0219 |

OTHER PUBLICATIONS

Qualcomm Incorporated, "NR uplink measurement based mobility in RRC_INACTIVE", 3GPP TSG-RAN WG2 Meeting No. NR Ad Hoc, Spokane, USA, Jan. 17-19, 2017, R2-1700582, pp. 1-4.

Holma et al., "LTE for UMTS OFDMA and SC-FDMA Based Radio Access", Wiley 2009, System Architecture Based on 3GPP SAE, 11 pages.
ETSI, LTE; Evolved Universal Terrestrial Radio Access (E-UTRA); Medium Access Control (MAC) protocol specification (3GPP TS 36.321 version 13.0.0 Release 13), ETSI TS 136 321 V13.0.0, Feb. 2016, pp. 1-83.
Huawei et al., "Evaluation on RAN initiated paging and MME initiated paging", 3GPP TSG-RAN WG2 Meeting No. 94 R2-163930, Nanjing, China, May 23-27, 2016, 12 pages.
NTT DOCOMO, "New SID Proposal: Study on New Radio Access Technology", 3GPP TSG RAN Meeting No. 71 RP-160671, Göteborg, Sweden, Mar. 7-10, 2016, 8 pages.
Huawei et al., "Energy conserved operation evaluation", 3GPP TSG-RAN WG2 #95bis R2-166907, Kaohsiung, Oct. 10-14, 2016, 8 pages.
Huawei et al., "Benefit of UL tracking", 3GPP TSG-RAN WG2 Meeting #95bis R2-166987, Kaohsiung, Oct. 10-14, 2016, 7 pages.
Qualcomm Incorporated, "NR uplink measurement based mobility in the inactive state", 3GPP TSG-RAN2#95bis R2-167066, Kaohsiung, Taiwan, Oct. 10-14, 2016, pp. 1-5.
Huawei et al., "Proposed Way Forward on Uplink-Based Mobility", 3GPP TSG-RAN WG2 Meeting #95bis R2-167286, Kaohsiung, Oct. 10-14, 2016, 2 pages.
Intel Corporation, "Discussion on RAN notification area for the new RRC state", 3GPP TSG RAN WG2 Meeting No. 96 R2-168524, Reno, USA, Nov. 14-18, 2016, 3 pages.
Intel Corporation, "RAN based Update mechanism for new RAN state", 3GPP TSG RAN WG2 Meeting No. 96 R2-168525, Reno, USA, Nov. 14-18, 2016, 2 pages.
Qualcomm Incorporated, "NR RRC Inactive State principles— RAN based notification area", 3GPP TSG-RAN WG2 Meeting No. 96 R2-168602, Reno, US, Nov. 14-18, 2016, 2 pages.
NTT Docomo, Inc., "Text Proposal to TR 38.804 on UE states and state transitions for NR", 3GPP TSG-RAN WG2 #96 R2-168856 Revision of R2-168089, Reno, USA, Nov. 14-18, 2016, pp. 1-4.
Huawei et al., "New WI proposal: Signalling reduction to enable light connection for LTE", 3GPP TSG RAN Meeting No. 71 RP-160540, Gothenburg, Sweden, Mar. 7-10, 2016, 7 pages.
NTT Docomo, "Revision of SI: Study on New Radio Access Technology", 3GPP TSG RAN Meeting No. 73 RP-161596 revision of RP-161214, New Orleans, Sep. 19-22, 2016, 7 pages.

* cited by examiner

TRANSMISSION OF UPLINK REFERENCE SIGNALLING ACCORDING TO DIFFERENT UPLINK REFERENCE SIGNALLING CONFIGURATIONS

CROSS-REFERENCE TO RELATED APPLICATIONS

The present application is based on PCT filing PCT/EP2017/082858, filed Dec. 14, 2017, which claims priority to EP 17151167.8, filed Jan. 12, 2017, the entire contents of each are incorporated herein by reference.

BACKGROUND

Field

The present disclosure relates to telecommunications apparatus and methods, and in particular to handling mobility in wireless telecommunications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles, and to operate over a large range of frequencies, for example from hundreds of MHz to 100 GHz. This can be expected to result in networks with different architectures and operating principles as compared to currently deployed networks.

Example use cases currently considered to be of interest for next generation wireless communication systems include so-called Enhanced Mobile Broadband (eMBB) and Ultra Reliable and Low Latency Communications (URLLC). See, for example, the 3GPP document RP-160671, "New SID Proposal: Study on New Radio Access Technology," NTT DOCOMO, RAN #71 [1].

The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G network). One particular area where new approaches may be helpful is in relation to handovers between network nodes responsible for communicating with a terminal device, which may be referred to as mobility management. It will be appreciated in this context terminal device mobility may result from the device physically moving relative to the coverage areas of different network nodes or from changing radio conditions associated with different network nodes for a static device, and the term mobility management may be used for both scenarios.

With current mobile telecommunications systems, such as those based on the 3GPP defined UMTS and Long Term Evolution (LTE) based architectures, handover procedures are carried out on the basis of measurements of downlink signals broadcast by each of the network nodes. These measurements are performed by terminal devices and network node selection, reselection or handover is then performed on the basis of these measurements.

Existing approaches for handling mobility, with the associated measurement report signalling, handover signalling and evaluation procedures, however, can result in relatively high power consumption by a terminal device and require terminal devices to comprise relatively complex equipment for performing such measurements over a range of different radio frequencies. This results in lower terminal device battery life. In addition, existing handover procedures require a relatively large number of messages to exchanged, which results in a relatively high control signalling overhead and increased chance of handover failure, particularly in the case of small cells and/or fast moving terminal devices, because of the time taken to perform the measurements and signalling.

In view of these drawbacks there is a desire to provide new approaches for efficiently handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
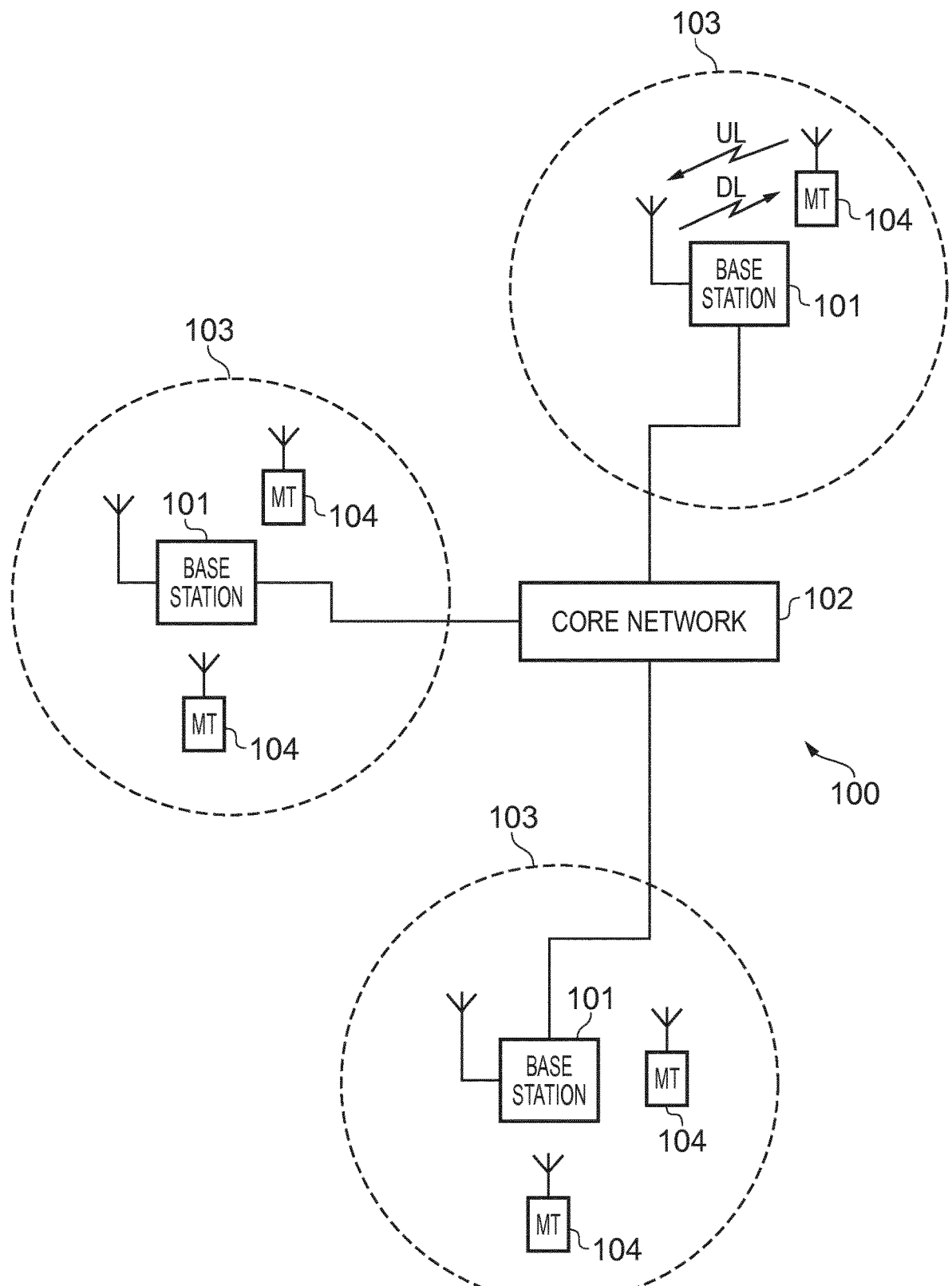
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of radio network infrastructure equipment/access nodes, may also be referred to as transceiver stations/nodeBs/e-nodeBs, eNB, gNB, and so forth. Furthermore, it will be appreciated the terms base station and cell may also sometimes be used interchangeably, for example, the process of a terminal device connecting to the radio access part of a wireless telecommunications system might be referred to as accessing a cell or accessing a base station (or more generally a radio network infrastructure equipment). Nonetheless, it will be appreciated in some cases the physical apparatus comprising a base station (radio network infrastructure equipment) may comprise equipment for supporting more than one communication cell and in such cases it may still be appropriate to draw a distinction between base stations and cells.

Figure 2:
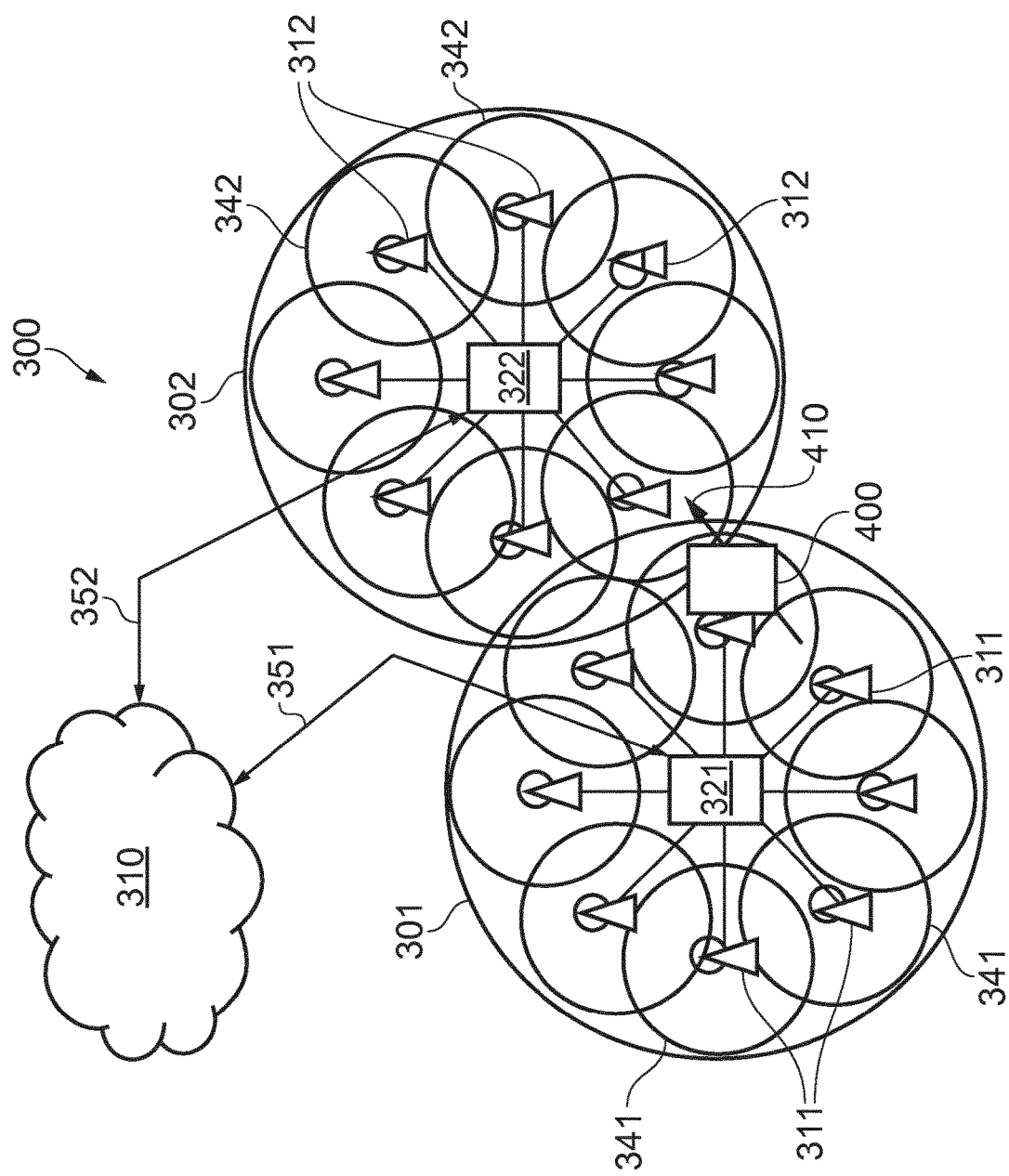
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio network access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term radio network infrastructure equipment may be used to encompass these elements and more conventional base station type elements of wireless telecommunications systems. Thus, radio network infrastructure equipment in this context may be generally considered to comprise at least one transceiver entity (radio network node) for transmitting and receiving radio signals for communicating with terminal devices and a controller entity for controlling the operation of the transceiver entity/entities. For an LTE type architecture of the kind represented in FIG. 1, the controller entity and transceiver entity are typically co-located, i.e. the radio network infrastructure equipment comprises a base station 101. However, in an NR type architecture of the kind represented in FIG. 2, the radio network infrastructure equipment comprises a controller entity and a plurality of transceiver entities (radio network nodes) which are distributed and not co-located with the controller entity, i.e. each radio network infrastructure equipment comprises a controlling node 321, 322 and an associated plurality of remote TRPs/distributed units 311, 312.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. While in some cases communications for a given terminal device may be routed through only one of the distributed units, it will be appreciated in some other implementations communications associated with a given terminal device may be routed through more than one distributed unit, for example in a soft handover scenario and other scenarios. The particular distributed unit(s) through which a terminal device communicates with the associated controlling node may be referred to as active distributed units for the terminal device. The active distributed units for a terminal device may comprise one or more than one distributed unit (TRP/radio network node). The controlling node 321 is responsible for determining which of the distributed units 311 spanning the first communication cell 301 is responsible for serving the terminal device 400 when it is connected to the network (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

Certain embodiments of the invention as discussed herein may be implemented in wireless telecommunication systems/networks according to various different architectures, such as the example architectures shown in FIGS. 1 and 2 or in other architectures that may be adopted. It will thus be appreciated the specific wireless telecommunications architecture in any given implementation is not of primary significance to the principles described herein. In this regard, certain embodiments of the disclosure may be described generally in the context of a radio network infrastructure equipment (comprising a controller entity and one or more transceiver entities as discussed above) communicating with a terminal device, wherein the specific nature of the radio network infrastructure equipment and the terminal device will depend on the network infrastructure architecture for the implementation at hand. For example, in some scenarios the radio network infrastructure equipment may comprise an LTE-type base station 101 as shown in FIG. 1 which is adapted to provide functionality in accordance with the principles described herein, and in other examples the radio network infrastructure equipment may comprise a controlling node 321, 322 and its associated TRPs 311, 312 of the kind shown in FIG. 2 which are adapted to provide functionality in accordance with the principles described herein.

As is well understood, various wireless telecommunications networks, such as the LTE-based network represented in FIG. 1 and the NR-based network represented in FIG. 1, support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE).

For a terminal device in RRC idle mode the core network is aware that the terminal device is present within the network, but the radio access network (RAN) part (comprising radio network infrastructure equipment such as the base stations 101 of FIG. 1 and the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entities most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to seek paging messages periodically. For terminal devices operating in a discontinuous reception (DRX) mode this occurs each time they wake up for their DRX active time. Paging signals for a specific terminal device are transmitted in defined frames (Paging Frames)/sub-frames (Paging Occasions) which are derived from the International Mobile Subscriber Identifier (IMSI) of the terminal device, as well as paging related DRX parameters established in system information transmitted within the network.

In a conventional LTE-based system, a terminal device thus receives and checks the contents of specific sub-frames (paging occasions) in specific frames (paging frames) to look for paging signalling. For example, in accordance with the standards set out in ETSI TS 136 321 V13.0.0 (2016 February)/3GPP TS 36.321 version 13.0.0 Release 13 [3], a Paging Frame (PF) is a downlink radio frame which may contain one or more Paging Occasion(s) (PO), where a Paging Occasion is a sub-frame in which there may be paging signalling. Paging signalling is conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by ETSI TS 136 321 V13.0.0 (2016 February)/3GPP TS 36.321 version 13.0.0 Release 13 [3]). All terminal devices check whether PDCCH at the specific PF/PO includes P-RNTI or not. If there is a PDSCH allocation addressed to P-RNTI in the relevant subframe, the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised existing LTE paging procedures, it is expected that some broadly similar principles may be adopted for future wireless telecommunications networks based on newer radio access technologies (RATs), such as 5G networks.

As already noted above, it is well understood that in wireless telecommunications networks, such as an LTE type network, there are different Radio Resource Control (RRC) modes for terminal devices. For example, it is common to support an RRC idle mode (RRC_IDLE); and an RRC connected mode (RRC_CONNECTED).

Generally speaking, in RRC connected mode a terminal device is connected to radio network infrastructure equipment (e.g. a base station or a controlling node via a TRP) in the sense of being able to receive user plane data from the radio network infrastructure equipment, and in RRC idle mode the terminal device is not connected to radio network infrastructure equipment in the sense of not being able to receive user plane data via from any radio network infrastructure equipment in the network. The RRC connection setup procedure of going from RRC idle mode to RRC connected mode may be referred to as connecting to a cell/radio network infrastructure equipment.

One characteristic of the RRC connected mode is the allocation of a cell-specific radio network temporary identifier (C-RNTI) to the terminal device to allow the radio network infrastructure equipment to which the terminal device is radio connected to address communications to the terminal device. A terminal device in a conventional RRC idle mode will not be associated with this kind of RNTI.

Another characteristic of the RRC connected mode is the association of one or more dedicated logical channels with the terminal device to allow the terminal device to exchange data with the radio network infrastructure equipment to which it is connected. A terminal device in a conventional RRC idle mode will not be associated with this kind of dedicated logical communication channel.

Another characteristic of the RRC connected mode is that a terminal device in RRC connected mode will have established a security context by exchanging security settings with the radio network infrastructure equipment to which it is attached as part of its RRC connection procedure. A terminal device in a conventional RRC idle mode will not, however, have this kind of established security context.

More generally, radio network infrastructure equipment to which a terminal device is connected in RRC connected mode will retain information relating to the terminal device, for example its allocated C-RNTI, logical channel configuration settings, security settings, and so on, to allow the radio network infrastructure equipment to communicate with the terminal device. This information may generally be referred to as a terminal device context in/at the radio network infrastructure equipment.

In accordance with conventional approaches, when a terminal device releases its RRC connection with respect to a particular radio network infrastructure equipment and transitions to conventional RRC idle mode, the radio network infrastructure equipment releases the terminal device context.

Whilst in RRC idle mode a terminal device will typically still receive some signalling from radio network infrastructure equipment covering its location (i.e. radio network infrastructure equipment within radio signalling range of its location). For example, in an LTE context an idle mode terminal device will typically receive reference signalling and other broadcast signalling from different radio network infrastructure equipment that are in range. Based on this signalling the idle mode terminal device is able to determine what would currently be the most appropriate radio network infrastructure equipment to connect to if the terminal device were required to establish a connection to the network, for example to transmit uplink data or in response to a paging request. This ongoing procedure/process for determining the most appropriate radio network infrastructure equipment to connect to is known as cell selection/reselection. The terminal device will synchronise to a selected radio network infrastructure equipment and decode relevant broadcast information, for example information transmitted in master information block (MIB) and system information block (SIB) transmissions, from the selected radio network infrastructure equipment so the terminal device is able to initiate a radio resource connection with the selected radio network infrastructure equipment as and when appropriate. A terminal device will also monitor a paging channel associated with the radio network infrastructure equipment to which it is synchronised in idle mode to identify if any paging requests are addressed to the terminal device. When a terminal device operating in an RRC idle mode wishes to transition to an RRC connected mode to exchange data with the network, it transmits an RRC connection request message to the currently selected radio network infrastructure equipment to initiate an RRC connection procedure in accordance with well-established techniques.

Thus to summarise some aspects of RRC idle and connected modes/states, In RRC Connected State, the network is aware of the UE's location at the cell level and has the UE context thereby allowing scheduling of physical resources for user data transmissions because the UE (terminal device) has been assigned a temporary ID (C-RNTI) which is unique to that UE within the cell and hence the UE can be directly addressed by the network. In the Idle Mode, the network is aware of the UE's location within a Tracking Area and does not have the UE context and cannot schedule physical resources for user data transmission because the UE does not have a unique identifier within a cell (C-RNTI). The UE moves from an Idle Mode to an RRC Connected State by establishing an RRC Connection which assigns a C-RNTI using a random access (RACH) procedure. The UE moves from RRC Connected State to Idle Mode by releasing its RRC Connection (and hence releasing C-RNTI). In idle mode, a UE is addressed by first paging the cells within the tracking area. The UE monitors for P-RNTI (paging identifier) on PDCCH rather than C-RNTI as it does in RRC connected state. The paging message which is received following P-RNTI detection contains the UE identity, and if the UE receives this it will then respond by establishing an RRC connection and having a C-RNTI assigned.

The use of RRC idle mode can be beneficial for a terminal device, for example in terms of power saving. However, a drawback of switching to RRC idle is the signalling overhead associated with establishing a new RRC connection when the terminal device is required to reconnect to radio network infrastructure equipment and exchange data with the radio network infrastructure equipment to allow the radio network infrastructure equipment to establish a context for the terminal device. This signalling overhead has an impact for the terminal device in terms of using power and also for the wireless telecommunications network as a whole in terms of taking up radio resources that might otherwise be used for other communications. Consequently, there is typically a compromise to be made between entering RRC idle mode frequently (to preserve terminal device power) and remaining in RRC connected mode for longer periods (to reduce re-connection signalling overhead).

This means that while RRC idle and RRC connected states can help efficiently support communications in scenarios involving the transmission of relatively large amounts of data, it has been recognised that these states may be less efficient in supporting communications in all scenarios, for example in scenarios in which relatively small amounts of data are transmitted, potentially relatively frequently, for example in accordance with some of the new types of traffic profiles that may be expected to become more prevalent in new telecommunication systems.

With this in mind it has been proposed for Release 14 of the 3GPP standard to consider using a modified approach for RRC modes/states to support certain communications. See, for example, the 3GPP document "New WI proposal: Signalling reduction to enable light connection for LTE", 3GPP TSG RAN Meeting #71, RP-160540, Gothenburg, Sweden, 7-10 Mar. 2016 [4].

One proposal is to define a new/modified RRC mode in which the a UE is not in an active RRC connected mode with the radio access network (RAN), but is considered to be RRC Connected from a CN (core network) point of view, so that data can be sent without CN-level paging, but with paging performed instead at the RAN level, to cause/trigger the UE to resume RRC connection (enter an RRC connected mode). This modified RRC state may be referred to as an "RRC connected inactive" state and may have characteristics as discussed in the 3GPP document "Text Proposal to TR 38.804 on UE states and state transitions for NR", 3GPP TSG-RAN WG2 #96, R2-168856, 14-18 Nov. 2016 [5]. This approach has the benefit of being able to allow the UE to enter a more power efficient state, while reducing the signalling between the CN and the RAN. The overall procedure allows RAN to take over responsibility for paging the UE, effectively hiding the RRC state transitions and mobility from the CN, and the CN therefore may directly send data as if the UE was still connected and in the same cell.

Much like conventional paging procedures at the CN level (e.g. as discussed above), paging procedures at the RAN level may be associated with a RAN notification area corresponding to the CN tracking area concept. That is to say, the radio network transceiver entities (e.g. in base stations or TRPs) supporting the RAN in a network may be notionally divided into groups of transceiver entities comprising respective RAN notification areas. A terminal device leaving a RAN notification area may be configured to inform/update the network of it changing location in much the same way as a terminal device leaving a conventional tracking area transmits a tracking area update. In principle the RAN notification areas may correspond with the CN level tracking areas of the network in some implementations, and in that sense the terminology notification area and tracking area may to some extent be used interchangeably. However, it will be appreciated there is no need for the RAN level notification areas/tracking areas to correspond in size and arrangement with the CN level tracking areas, and in fact it may expected in practice that the RAN level notification areas will typically be smaller (i.e. comprise fewer radio network nodes) than the CN level paging areas (i.e. what are referred to as tracking areas in LTE terminology), and further more may be terminal device specific. However, the relative sizes of, and the degree of correspondence, if any, between, the RAN level notification areas and the CN level paging areas is not significant to the principles described herein.

Thus, from the RAN point of view, an "anchor" network infrastructure equipment (e.g. the last network infrastructure equipment a terminal device was connected to) may be defined, which stores the terminal context information. When the CN attempts to transmit data to the terminal device, the RAN then attempts to page the terminal device on the anchor network infrastructure equipment, and if there is no response, the paging may then be performed on all of the cells in the tracking area/RAN notification area, in order to locate the terminal device. A summary of this approach may be found in the 3GPP document "Evaluation on RAN initiated paging and MME initiated paging", 3GPP TSG-RAN WG2 Meeting #94, R2-163930, Nanjing, China, 23-27 May, 2016 [6]. It will be appreciated there are various aspects of the specific paging procedure that may be adopted, for example in terms of whether the anchor radio network infrastructure equipment should instruct other network infrastructure equipment in the RAN tracking/notification area to attempt to page the terminal device at the same time as the anchor radio network infrastructure equipment pages the terminal device or only after failing to successfully page the terminal device, that will depend on the implementation at hand, and are not significant here.

The overall procedure in the RAN part of the network, from a terminal device's point of view, may be similar to the suspend/resume procedure introduced in Release 13 of the 3GPP standards for "Internet of Things" terminal devices. Thus when a terminal device connection to network infrastructure equipment is released, a "resume ID" is assigned to context information stored in the network for the terminal device, and when the terminal device reconnects using the "resume" procedure, the resume ID is used to locate the stored context information for the terminal device in the network.

Recent discussions within the 3GPP community have further considered issues of notification/tracking in a RRC connected inactive state for 5G new Radio (NR or 5G-RAN), for example as set out in the 3GPP documents "RAN based Update mechanism for new RAN state", 3GPP TSG RAN WG2 Meeting #96, R2-168525, Reno, USA, 14-18 Nov. 2016 [7]; "Discussion on RAN notification area for the new RRC state" 3GPP TSG RAN WG2 Meeting #96, R2-168524, Reno, USA, 14-18 Nov. 2016 [8]; and "Inactive State principles—RAN based notification area", 3GPP TSG RAN WG2 Meeting #96, R2-168602, Reno, USA, 14-18 Nov. 2016 [9]. Based on these discussions various aspects relating to using this type of approach have been discussed, such as:

RAN2 should assume that UEs perform CN level location updates when crossing a TA boundary when in RRC connected inactive mode (in addition to RAN updates based on RAN notification areas).

There will be NG Core/CN Location Area code (similar to Tracking Area code) broadcast in system information of an NR Cell.

RAN based notification area is UE-specific and configurable by the radio network node via dedicated signalling.

There will be a unique global Cell ID broadcast in system information of NR Cell.

For the RRC connected inactive state there will be a way to configure the UE with a RAN based notification area that is smaller than a TA.

A RAN notification area may cover a single cell or multiple cells.

In currently deployed telecommunications systems, such as LTE based systems, mobility management is typically performed on the basis of measurements by a terminal device of downlink reference signals broadcast by network infrastructure equipment (i.e. base stations in an LTE context). However, there have been proposal for future wireless telecommunications systems to instead, or additionally, use measurements by network infrastructure equipment of uplink reference signalling transmitted by terminal devices to support mobility management. In particular, it has been proposed that mobility management for terminal devices in an RRC connected inactive state should be based on measurements of uplink reference signalling, which may be referred to as "uplink based mobility". See, for example, the 3GPP documents: "Proposed Way Forward on Uplink-Based Mobility", 3GPP TSG-RAN WG2 Meeting #95bis, R2-167286, Kaohsiung, 10-14 Oct. 2016 [10]; "NR uplink measurement based mobility in the inactive state" 3GPP TSG-RAN WG2 Meeting #95bis, R2-167066, Kaohsiung, 10-14 Oct. 2016 [11]; "Benefit of UL tracking" 3GPP TSG-RAN WG2 Meeting #95bis, R2-166987, Kaohsiung, 10-14 Oct. 2016 [12]; and "Energy conserved operation evaluation", 3GPP TSG-RAN WG2 Meeting #95bis, R2-166907, Kaohsiung, 10-14 Oct. 2016 [13]. These documents may be referred to for more information on the proposals for uplink based mobility.

Thus, for an uplink based mobility approach in an NR architecture of the kind schematically represented in FIG. 2, rather than the terminal device 400 performing measurements on downlink signalling transmitted by the TRPs 311, 312, the terminal device 400 instead transmits uplink reference signalling which can be measured by the TRPs (distributed units/transceiver entities) which are in range to receive the uplink reference signalling. Based on these measurements, the controlling node for the communication cell in which the terminal device is located may track the location of the terminal device, e.g. to (i) determine which of the (one or more) distributed units/transceiver entities is most appropriate for supporting communications between the controlling node and the terminal device (i.e. which TRP(s) should be active for the terminal device), and configure their operation accordingly; and/or (ii) determine if the terminal device is approaching the edge of the cell supported by the controlling node so that a change of cell such as a handover or reselection procedure should be initiated.

Thus, the radio/channel conditions associated with a communication path between a terminal device and one or more transceiver entities may be determined based on measurements of a characteristic of uplink reference signalling transmitted by the terminal device and received by the respective ones of the transceiver entities. There are a number of different characteristics of uplink reference signalling that may be measured to determine an indication of radio channel conditions associated with a radio path between the terminal device and each respective radio transceiver entity receiving the reference signalling. For example, the measured characteristic may be an indication of the received signal strength or quality of the reference signalling, and a controller entity (e.g. a controlling node 321, 322 in the example architecture of FIG. 2) may establish a location for the terminal device (in the sense of determining an indication of a position for the terminal device relative to the network of transceiver entities) based on the measured characteristics. For example, by an interpolation between the transceiver entity locations weighted towards the transceiver entities measuring the greatest power/quality may be used to derive a specific geographic location for the terminal device, or the terminal device location may simply be determined be establishing which particular transceiver entity is closest to the terminal device (in the sense of receiving the uplink reference signal with the greatest power or quality).

Although, as discussed further herein, certain embodiments of the disclosure are concerned with configuring aspects of uplink based mobility signalling, it will be appreciate the specific manner in which a location for the terminal device is derived from the measurements of uplink signalling, and also the manner in which the derived location is used to manage mobility (e.g. in terms of determining which specific transceiver entity/entities should be active for the terminal device and/or whether a handover procedure should be initiated) will depend on the implementation at hand and are not significant to the principles described herein for configuring uplink reference signalling.

Figure 3:
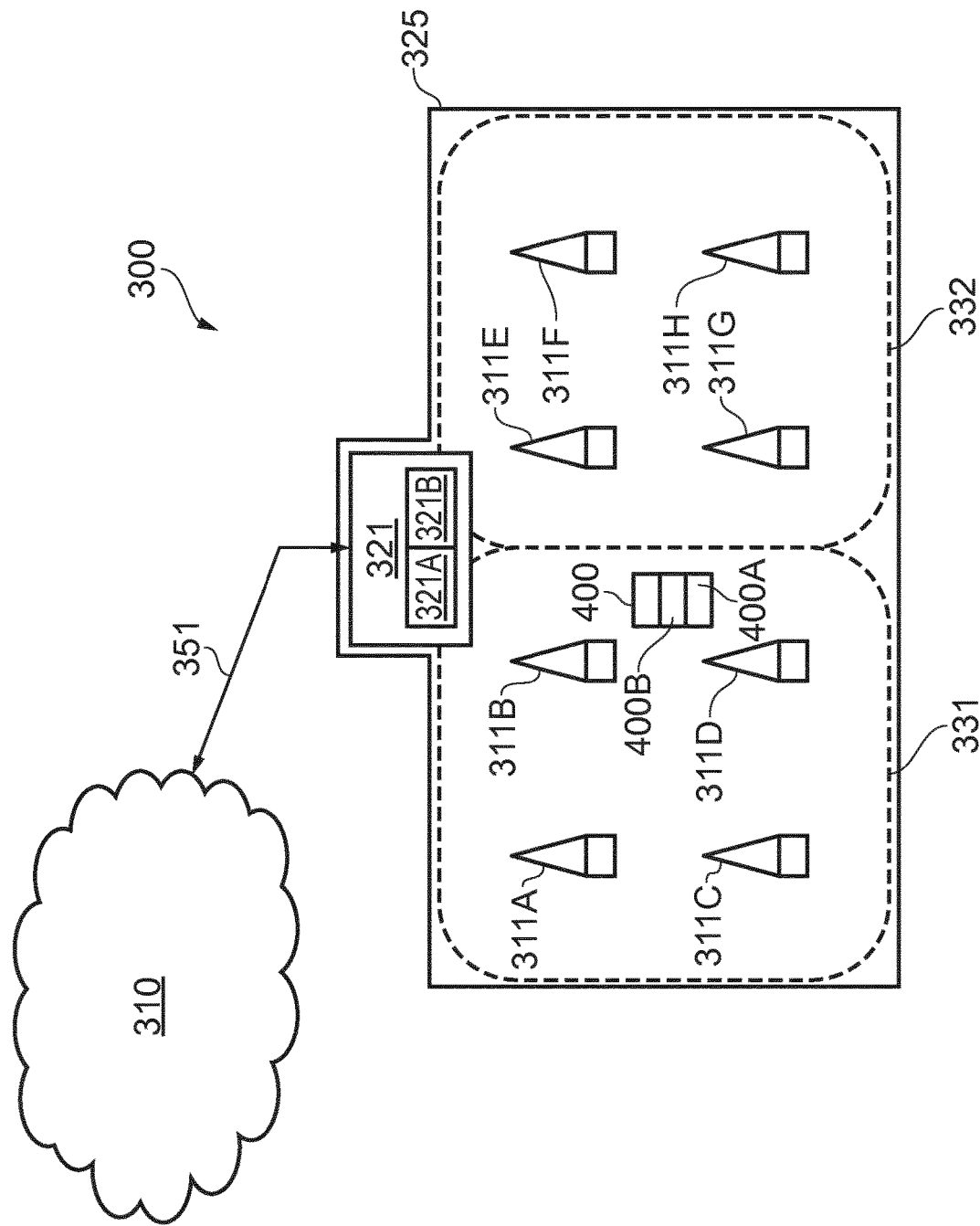
FIG. 3 schematically represents some aspects of the new radio access technology (RAT) wireless telecommunications network of FIG. 2.

FIG. 3 schematically represents some aspects of the wireless telecommunications system 300 of FIG. 2 in accordance with certain embodiments of the disclosure. In particular, FIG. 3 shows the controlling node 321, eight of the TRPs 311 associated with the controlling node 321 (these are identified by reference numerals 311A, 311B, . . . 311H in FIG. 3), the core network part 310, and the terminal device 400. As previously noted, aspects of the architecture and operation of the telecommunications system 300 which are not specifically described herein may be implemented in accordance with any known techniques. In line with the terminology discussed above, the TRPs 311 and controlling node 321 may be consider together to correspond with a network infrastructure equipment 325 of the system 300 (with other controlling nodes and their TRPs, not shown in FIG. 3, providing other elements of network infrastructure equipment for the system 300). Furthermore, the controlling node 321 may also be referred to as a controller entity for the network infrastructure equipment 325 and the TRPs 311 may also be referred to as transceiver entities for the network infrastructure equipment 325.

Thus, the telecommunications system 310 infrastructure comprises the core network part 310 and a radio network part comprising the network infrastructure equipment 325 made up of the controlling node 321 and the TRPs 311. In FIG. 3 only one controlling node 321 (with eight TRPs 311) and one terminal device 400 are shown for simplicity, but it will of course be appreciated that in practice the radio network part will typically comprise a larger number of controlling nodes respectively associated with different numbers of TRP and serving a larger number of terminal devices across various communication cells. The terminal device 400 is operable to communicate data to and from the controlling node 321 via one or more or the TRPs when in range of the communication cell supported by the controlling node 321.

The controlling node 321 comprises transceiver circuitry 321a (which may also be referred to as a transceiver/transceiver unit) for communicating (wirelessly or otherwise) with the core network 310 and the TRPs 311 and processor circuitry 321b (which may also be referred to as a processor/processor unit) configured to control the controlling node 321 to operate in accordance with embodiments of the present disclosure as described herein. The processor circuitry 321b may comprise various sub-units for providing functionality in accordance with embodiments of the present disclosure as explained further herein. These sub-units may be implemented as discrete hardware elements or as appropriately configured functions of the processor circuitry. Thus, the processor circuitry 321b may comprise circuitry which is suitably configured/programmed to provide the desired functionality described herein using conventional programming/configuration techniques for equipment in wireless telecommunications systems. The transceiver circuitry 321a and the processor circuitry 321b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the controlling node 321 will in general comprise various other elements associated with its operating functionality.

The respective TRPs/distributed units 311 are functionally identical but serve the different parts of the communication cell 301 supported by the controlling node 321, for example as schematically indicated in FIG. 2. Each TRP 311 comprises a transceiver unit (schematically represented as the upper triangular part each TRP in FIG. 3) for transmission and reception of communications (wirelessly or otherwise) between the respective TRPs 311 and their associated controlling node 321 and also for transmission and reception of wireless radio communications between the respective TRPs and terminal devices within their radio communication range/footprint. Each TRP 311 further comprises a processor unit (schematically represented as the lower rectangular part of each TRP in FIG. 3) configured to control the operation of the TRP 311 in accordance with the principles described herein. The respective processor units of the TRPs may comprise various sub-units. These sub-units may be implemented as discrete hardware elements or as appropriately configured functions of the processor unit. Thus, the respective processor units may comprise a processor unit which is suitably configured/programmed to provide the desired functionality described herein using conventional programming/configuration techniques for equipment in wireless telecommunications systems. The respective transceiver units and processor units are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the TRPs will in general comprise various other elements, for example a power supply, associated with their operating functionality.

The terminal device 400 comprises transceiver circuitry 400a (which may also be referred to as a transceiver/transceiver unit) for transmission and reception of wireless signals and processor circuitry 400b (which may also be referred to as a processor/processor unit) configured to control the terminal device 400. The processor circuitry 400b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 400b may comprise circuitry which is suitably configured/programmed to provide the desired functionality described herein using conventional programming/configuration techniques for equipment in wireless telecommunications systems. The transceiver circuitry 400a and the processor circuitry 400b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 400 will in general comprise various other elements associated with its operating functionality, for example a power source, user interface, and so forth, but these are not shown in FIG. 3 in the interests of simplicity.

The terminal device 400 in the wireless telecommunications system represented in FIG. 3 is configured to transmit uplink reference signals to facilitate mobility management in accordance with the principles set out above. That is to say, the terminal device is configured to transmit uplink reference signalling which is received by ones of the TRPs which are in range of the terminal device's uplink signalling. The TRPs may measure a characteristic of the uplink signalling, for example a received power, and provide an indication of this to the controlling node 321. Based on this information, the controlling node 321 may determine a location for the terminal device within the communication cell that supports and control communications with the terminal device accordingly (for example determining which TRPs should be used to communicate with the terminal device and whether or not the terminal device should be handed over to a neighbouring cell).

In this regard, it may be expected the uplink signalling transmitted by the terminal device will be configurable, for example to include an indication of an identifier for the terminal device and also to conform to a format the uplink signalling which the local TRPs are configured to receive, for example in terms of timings and frequency resources used, to allow the TRPs to receive the uplink signalling. Furthermore, it may be expected that different configurations of uplink signalling may be used in respect of different TRPs. For example, different groups of TRP may be configured to seek uplink mobility signalling on different radio resources (in terms of time and/or frequency), and different identifiers for the terminal device may be defined for different groups of TRP (so that identifies can be reused in different groups of TRP). Furthermore, a terminal device may be configured to transmit uplink reference signalling at different powers depending on the spatial density of TRPs around its current location. For example, a terminal device in a sparsely populated area may be required to transmit uplink reference signalling with a higher power than a terminal device in a densely populated area.

For the example system 300 schematically represented in FIG. 3, and as schematically indicated by dashed lines in the figure, it is assumed the eight TRPs 311 here are notionally divided into two groups of four TRPs, namely a first group of TRPs 311A-D providing radio coverage in a first zone 331 and a second group of TRPs 311 E-H providing radio coverage in a second zone 332, and that the terminal device's uplink signalling for the TRPs in the first zone 331 is different from the terminal device's uplink signalling for the TRPs in the second a zone 332, such that the terminal device uplink signalling requires reconfiguration when moving between, or in the vicinity of the boundary of, the two zones 331, 332. Certain embodiments of the disclosure relates to approaches for reconfiguring a terminal device is uplink reference signalling in such a scenario.

Figure 4:
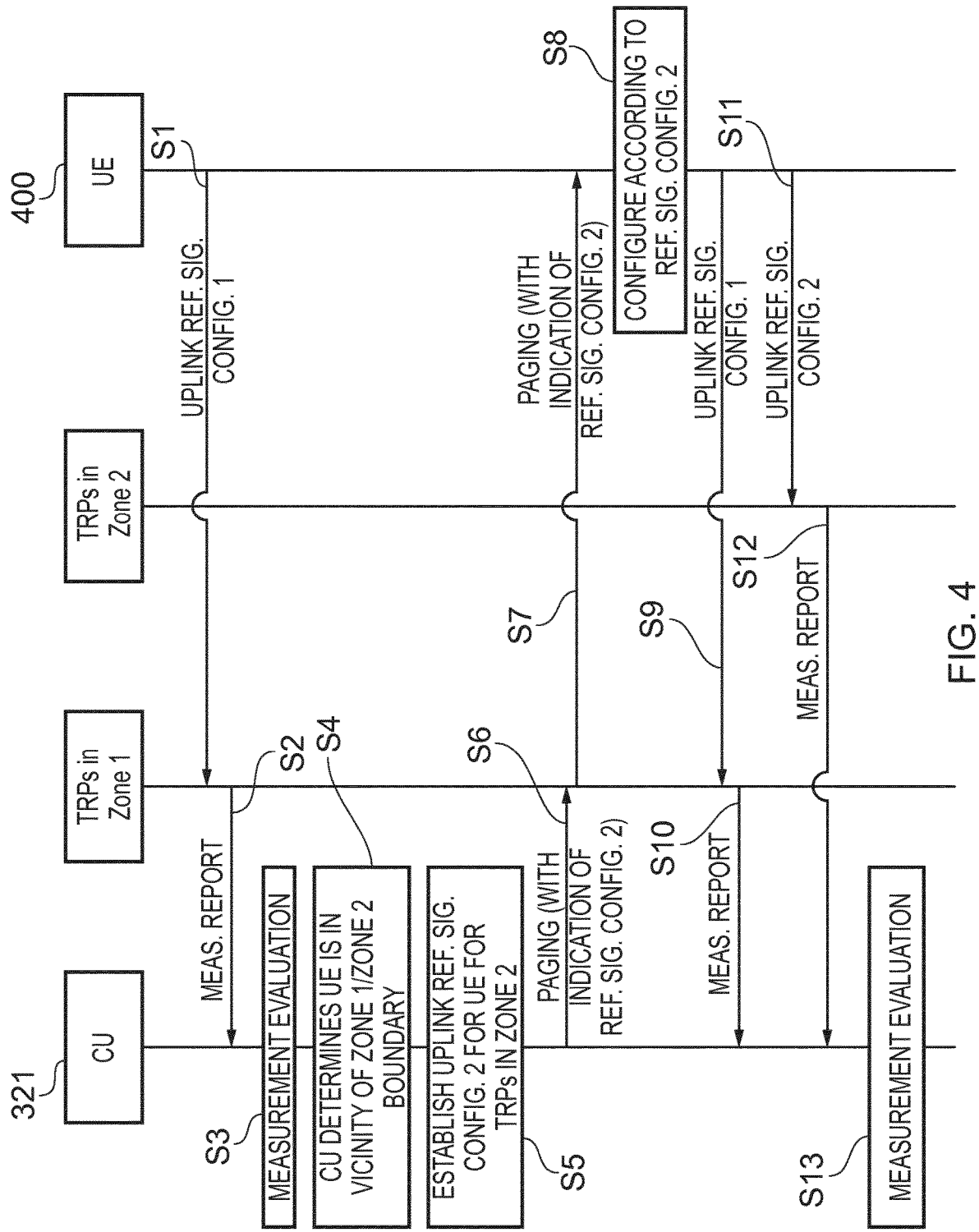
FIG. 4 is a signalling ladder diagram schematically representing signalling/message exchange between elements of the wireless telecommunications network of FIG. 3 in accordance with certain embodiments of the present disclosure.

FIG. 4 is a ladder diagram schematically showing signalling exchange between the controlling node 321, TRPs in the first zone 331, TRPs in the second zone 332, and the terminal device 400 in accordance with certain embodiments of the disclosure.

At the beginning of the processing represented in FIG. 3 it is assumed it is assumed the terminal device 400 is located within the geographic foot print of the first zone 331 in the vicinity of the boundary between the first zone 331 and second zone 331, as schematically shown in FIG. 3. It is also assumed the terminal device is not in an active RRC connected mode but is in an RRC connected inactive mode of the kind recently proposed and discussed above. It is further assumed that prior to entering the non-active RRC connected mode, the terminal device was in an active RRC connected mode with respect to the controlling node 321 via one or more of the TRPs 311A-D in the first zone 331, for example, because the terminal device was previously involved in an ongoing data communication session via one of the these TPRs in the first zone 331. It is further assumed the terminal device is configured to transmit uplink reference signalling in accordance with a first configuration corresponding to that defined for use in the first communication zone 331. The configuration settings for the uplink reference signalling for the terminal device to use in respect of the first zone 331 may have been previously configured with the terminal device in the RRC connected inactive mode in the same way as discussed further below with respect to reconfiguring the terminal device for transmitting uplink reference signalling for use in the second zone 332, or it may have been configured using conventional signalling exchange whilst in the RRC connected mode. For example, the terminal device may have been previously configured for transmitting uplink reference signalling appropriate to the first zone 331 when its RRC connection with the controlling node 321 via a TRP in the first zone was released.

Thus, in step S1 represented in FIG. 4, the terminal device 400 transmits uplink reference signalling in accordance with a first configuration (uplink ref. sig. config. 1). This may be transmitted in accordance with previously proposed techniques for using uplink reference signalling in wireless telecommunications systems supporting an RRC connected inactive state, for example as discussed in the above-referenced documents, such as "NR uplink measurement based mobility in the inactive state" 3GPP TSG-RAN WG2 Meeting #95bis, R2-167066, Kaohsiung, 10-14 Oct. 2016 [11]. In that regard, the terminal device 400 may thus operate in a DRX mode in the RRC connected inactive state and be configured to transmit uplink reference signalling during DRX wake-up periods when the terminal device monitors for paging signals (see, for example, FIG. 5 in "NR uplink measurement based mobility in the inactive state" 3GPP TSG-RAN WG2 Meeting #95bis, R2-167066, Kaohsiung, 10-14 Oct. 2016 [11]).

The configuration for the uplink reference (beacon) signalling may include various settings for different properties of the uplink reference signalling depending on the implementation at hand. For example, parameters/settings that may be configured may include a signature sequence to be used for the uplink reference signalling, an identifier for the terminal device associated with the uplink reference signalling (so the network can identify the terminal device sending the uplink reference signalling, a power setting to use for the uplink reference signalling, a beam direction or being sweep properties to be used for the uplink reference signalling, an indication of physical radio resources to use for the uplink reference signalling, for example in terms of time/frequency, an uplink channel configuration for the uplink reference signalling, an indication of a rate of transmission for the uplink reference signalling. However, it will be appreciated certain embodiments of the disclosure relate to how uplink reference signalling may be (re)configured/changed, and the specific nature of the uplink reference signalling in terms of its specific characteristics and the settings which may be configured are not of primary significance to the principles described herein. That is to say, what is of primary significance is how the settings can be changed (i.e. how the uplink reference signalling from a terminal device can be reconfigured) rather than what the settings represent in any given implementation.

A number of the TRPs 311 in the first zone 331 will receive and measure a characteristic of the uplink reference signalling, for example a received power or signal quality, which provides an indication of radio channel conditions between the terminal device and the respective TRPs (which fundamentally is what may be used to locate the terminal device). The specific characteristic which is measured will depend on the implementation of uplink based mobility reference signalling at hand. It may be expected not all TRPs in the first zone 331 will receive the uplink reference signalling, for example because the uplink signalling is not transmitted with sufficient power to be received by the more distant TRPs. It will be appreciated TRPs in the second zone 332, in particular TRPs in the second zone which are close to the boundary of the first and second zones near where the terminal device is located, may in principle receive the uplink reference signalling with sufficient power to decode it, but do not do so because the uplink reference signalling is transmitted with a configuration which relates to the first zone 331, and not the second zone 332.

The TRPs in the first zone (zone 1) 331 which do receive and measure the relevant characteristic of the uplink reference signalling proceed to transmit respective measurement reports to the controlling node 321 (along with an indication of the terminal device to which the measurement report relates), as schematically indicated by step S2 in FIG. 4.

In step S3, the controlling node 321 receives the measurement report from the TRPs that received the uplink reference signalling and establishes a location for the terminal device within the communication cell supported by the controlling node 321 based on these measurements. This measurement and evaluation procedure/terminal device location determination may, for example, be performed in accordance with previously proposed techniques. More generally, it may be based on any techniques for establishing a location for a terminal device based on measurement of radio conditions between a transceiver entity and the terminal device, regardless of whether the measurements are made in respect of uplink or downlink beacon signalling.

Having established a location for the terminal device in step S3, the controlling node 321 may respond accordingly. For example, the controlling node may use this information to determine which transceiver entities 311 should be used to route any communications to/from the terminal device, and may also determine if the terminal device is sufficiently close to the boundary of a communication area governed by the controlling node, that a handover procedure should be initiated.

In this particular example, and as schematically indicated in step S4, the controlling node 321 determines the terminal device is approaching the boundary between the first zone 331 and the second zone 332. Consequently, the controlling node determines the terminal device should be configured to transmit uplink reference signalling that can be received by the transceiver entities 311 E-H in the second zone 332 to allow uplink reference signalling from the terminal device to be received by transceiver entities 311 E-H in the second zone to be used to help determine a location for the terminal device.

In step S5 the controlling node 321 establishes a configuration for uplink reference signalling for the terminal device to use in respect of the transceiver entities 311 E-H in the second zone 332, which may be referred to here as a second uplink reference signalling configuration (uplink ref. sig. config. 2). In this particular example in which the controlling node is responsible for the transceiver entities in both the first zone and the second zone, the controlling node will have ready access to this information because it will have been responsible for configuring the transceiver entities accordingly. In other example implementations in which the transceiver entities in the second zone 332 are governed by a different controlling node, the controlling node wishing to establish the uplink configuration settings for the second zone may, for example, request this information from the other controlling node.

In accordance with embodiments of the disclosure, the controlling node 321 is configured to provide the terminal device 400 with an indication of the second uplink reference signalling configuration established in step S5 in association with a paging message for the terminal device.

Thus, as schematically indicated in steps S6 and S7, having established the terminal device 400 should be provided with updated configuration information, the controlling node 321 transmits a paging message to the terminal device 400 via one or more of the TRPs in the first zone 331. The paging message of step S6 and S7 includes an identifier for the terminal device that allows the terminal device to determine it is the intended recipient of the paging message. In this regard, the paging message may be transmitted by the network infrastructure equipment comprising the controlling node 321 and the TRPs through which the message is routed to the terminal device generally in accordance with any proposed techniques. However, in accordance with certain embodiments of the disclosure, the paging message further conveys additional information to the recipient terminal device. In particular, the paging message comprises an indication of the second uplink reference signalling configuration. This may be provided in various ways. For example, the indication of the second configuration may comprise a complete specification of settings for all parameters relevant for defining the configuration, specification of settings for only those parameters in the second configuration which are different from the corresponding settings in the first configuration (i.e. a "delta" configuration), or an indication of which one of a plurality of predefined (for example configured by system information transmissions or previous dedicated signalling) configurations correspond with the second configuration.

Thus, the paging message of steps S6 and S7 may comprise physical transmission resource allocation signalling addressed to a common radio network temporary identifier for paging, P-RNTI, with transmissions on the physical transmission resources indicated by the allocation signalling containing an identifier for the terminal device and an indication of the new uplink reference signalling configuration for the terminal device to use to allow its uplink reference signalling to be received by the transceiver entities in the second zone 332.

In step S8, the terminal device receives the paging message of steps S6 and S7 and derives the second uplink reference signalling configuration from the indication in the paging message, and configures itself for transmitting uplink reference signalling in accordance with the second uplink reference signalling configuration (ref. sig. config. 2).

Accordingly, at this stage of the processing represented in FIG. 4, the terminal device 400 which had previously transmitted uplink reference signalling in accordance with the first uplink reference signalling configuration has been provided with a new/updated configuration for its uplink reference signalling, as received in association with the paging message transmitted from the controlling node 321 via one or more of the TRPs in the first zone 331.

In the example implementation considered here, it is assumed the network is configured so that a terminal device at the boundary between two zones is configured to transmit uplink reference signalling in accordance with both configurations so that transceiver entities in both zones can receive uplink reference signalling from the terminal device.

Thus, the terminal device transmits uplink reference signalling in accordance with the first uplink reference signalling configuration, and this may be received by TRPs in the first zone which are within communication range of the terminal device's uplink reference signalling, as schematically indicated in step S9. This step corresponds with, and will be understood from, step S1 discussed above. In step S10, the TRPs in the first zone which receive the uplink reference signalling transmitted by the terminal device in accordance with the first uplink reference signalling configuration forward corresponding measurement report to the controlling node 321. This step corresponds with, and will be understood from, step S2 discussed above.

In addition to transmitting uplink reference signalling in accordance with the first configuration in step S9, the terminal device also transmits uplink reference signalling in accordance with the second uplink reference signalling configuration, and this may be received by TRPs in the second zone which are within communication range of the terminal device's uplink reference signalling, as schematically indicated in step S11. This step corresponds with, and will be understood from, step S1 discussed above, except for using a different uplink reference signalling configuration which is relevant for different transceiver entities. In step S12, the TRPs in the second zone which receive the uplink reference signalling transmitted by the terminal device in accordance with the second uplink reference signalling configuration forward corresponding measurement report to the controlling node 321. This step corresponds with, and will be understood from, step S3 discussed above, except the signalling is received at the controlling node from different transceiver entities.

In step S13, having received measurement reports relating to uplink reference signalling received by the transceiver entities in both the first zone and the second zone, the controlling node 321 evaluates the measurements to determine a location for the terminal device. This step is similar to, and will be understood from, step S3 discussed above, although now includes measurement report from TRPs in both zones. As already noted, the specific manner in which the measurement reports are evaluated to determine a location for the terminal device, and indeed the specific action to be taken once the location for the terminal device is established, are not of primary significance to the principles described herein which provide approaches for reconfiguring a terminal device to modify an aspect of its uplink reference signalling.

Thus in accordance with the principles described herein, approaches are provided for reconfiguring uplink reference signalling transmitted by a terminal device to allow measurements of radio channel conditions between the terminal device and respective transceiver entities in a wireless telecommunications network/system. Furthermore, the reconfiguration setting for the terminal device may be communicated from the network to the terminal device in association with a paging message. Thus the uplink reference signalling for the terminal device may be reconfigured without the terminal device needing to establish an active radio resource control (RRC) connection with the network, for example, the terminal device may be reconfigured with a new uplink reference signalling while remaining in an inactive RRC connected mode/state of the kind discussed above. What is more, in accordance with certain embodiments of the disclosure, the terminal device may be reconfigured to transmit uplink reference signalling appropriate for a new zone/region of transceiver entities without needing to acquire system information relating to the new zone of transceiver entities.

In addition to the paging message conveying an indication of characteristics for the terminal device to use for reconfiguring its uplink reference signalling, in some example implementations the paging message for the terminal device may further comprises an indication of a characteristic of downlink reference signalling transmitted by one or more of the transceiver entities in the second zone (e.g. information identifying the area or zone identifier transmitted in the downlink reference signal of the adjacent zone). Accordingly, this can provide the terminal device with information needed for the terminal device to receive downlink reference signalling from transceiver entities in the second zone, again without needing to establish an active RRC connection. Thus, the updated configuration may instruct the terminal device to implement downlink mobility procedures in the adjacent zone/area (or in the overlapping area between the zones). Alternatively the configuration may instruct the terminal device to implement uplink mobility procedures in one frequency band and downlink mobility procedures in a different frequency band.

In some implementations the uplink reference signalling transmitted by the terminal device in accordance with the second uplink reference signalling configuration may be transmitted on a frequency which is outside a range of frequencies on which the radio transceiver entities in the first zone are configured to operate. In this regard, the procedure for reconfiguring the terminal device may be in relation to triggering transmission of reference signalling for performing an inter-frequency measurement to help determine whether an inter-frequency reselection should be performed.

As already noted, the terminal device may be configured to transmit the uplink reference signalling in accordance with the second configuration in addition to or instead of transmitting uplink reference signalling in accordance with the first uplink reference signalling configuration depending on the situation at hand. For example, if the reconfiguration is to change an aspect of the existing uplink reference signalling, for example a power setting, the uplink reference signalling in accordance with the second configuration may replace the uplink reference signalling in accordance the first configuration. However, if the reconfiguration is to trigger additional uplink reference signalling to be received by additional transceiver entities, for example as a terminal device is determined to approach a boundary between two zones of transceiver entities associated with different uplink reference signalling configurations, uplink signalling in accordance with the second configuration may be transmitted in addition to uplink signalling in accordance with the first configuration. Furthermore, as a terminal device moves away from a boundary in towards the centre of a zone, the reconfiguration may trigger the terminal device to stop transmitting reference uplink signalling associated with a different zone. That is to say, a paging-based reconfiguration of a terminal device's uplink reference signalling may involve reconfiguring a terminal device which is transmitting uplink reference signalling in accordance with more than one configuration to stop transmitting uplink reference signalling in accordance with one or more of the configurations. This provides one approach for "switching off" uplink reference signalling transmissions in accordance with a configuration that is no longer relevant for a terminal device once it moves away from transceiver entities in a zone associated with that configuration. Other approaches for deactivating uplink reference signalling in accordance with a particular configuration may involve the use of timers. For example, if a terminal device is configured to begin transmitting uplink reference signalling in accordance with a second configuration in addition to transmitting uplink reference signalling in accordance with a first configuration, the terminal device may further be configured to stop transmitting in accordance with one or other configuration after a given time has elapsed. The paging message which triggered the additional uplink reference signalling may indicate the timer duration and which of the two configurations to stop transmitting (for example based on a future predicted/extrapolated location for the terminal device). Alternatively, the duration of a timer may be predefined. In yet another example, a terminal device may be configured to stop transmitting in accordance with a first configuration after it has undergone a cell change away from the cell associated with the first configuration.

The uplink reference signalling configurations may be associated with different settings for one or more uplink reference signalling characteristics. For example, the different configurations may be associated with different settings for one or more of: (i) an uplink reference signalling signature sequence for the terminal device to use when transmitting the uplink reference signalling; (ii) an identifier for the terminal device for the terminal device to use when transmitting the uplink reference signalling; (iii) a transmission power setting for the terminal device to use when transmitting the uplink reference signalling; (iv) an indication of a rate at which uplink reference signalling should be transmitted (e.g. to take account of a changing speed for a terminal device); an indication of a transmission beam direction and/or a transmission beam sweep property for the terminal device to use when transmitting the uplink reference signalling; (v) radio resources, e.g. in terms of time and/or frequency, for the terminal device to use when transmitting the uplink reference signalling; (vi) an uplink channel configuration for the terminal device to use when transmitting the uplink reference signalling. The uplink reference signalling transmitted in accordance with the different uplink reference signalling configurations may, for example, be transmitted on different absolute radio frame channel numbers (ARFCN)/frequencies or at different times on the same absolute radio frequency channel number (ARFCN).

Although the terminal device may be provided with the indication of the changed configuration information in association with a paging message to allow the terminal device to receive the reconfiguration information without establishing an active RRC connection or decoding system information messages, in other examples the paging message may instruct the terminal device to obtain configuration information from system information (i.e. the paging message may comprise an indication of a system information update), for example which contains a configuration for each of the uplink signals, is available only in the system information which is broadcast on the TRPs around the border between zones, if the terminal device has not previously stored the configuration. The terminal device may additionally or alternatively be configured to receive system information from TRPs belonging to the second zone in order that it can start transmitting an uplink signal according to the configuration from the second zone. These approaches could be implemented by establishing a new system information block or new information elements inside an existing system information block.

In the specific example discussed above with reference to FIG. 4, the uplink reference signalling reconfiguration comprises configuring a terminal device which is transmitting uplink reference signalling in accordance with a first configuration associated with a first group of transceiver entities to additionally transmit uplink reference signalling in accordance with a second configuration associated with a second group of transceiver entities. However, it will be appreciated this is merely one example. For example, network infrastructure equipment may be configured to reconfigure a terminal device's uplink reference signalling in order to modify an aspect of its current uplink reference signalling, for example to increase power if it is determined transceiver entities are not reliably receiving the uplink reference signalling, or to change an identifier for the terminal device if it is determined there is a conflict with an identifier for another terminal device that has moved into range of the group of transceiver entities supporting the terminal device. That is to say, the process of reconfiguring a terminal device to modify an aspect of its uplink reference signalling in accordance with embodiments of the disclosure is not limited to scenarios in which the reconfiguration is made because of the terminal device is approaching a boundary between two groups of transceiver entities configured to receive uplink reference signalling with different configurations.

Furthermore, whereas in the example described above with reference to FIGS. 3 and 4 the transceiver entities in the first zone 331 and the transceiver entities in the second zone 332 are associated with a single controlling node 321 in an NR-type network architecture, as already noted, the same principles can be applied for different network architectures/deployments. For example, in another NR-type network deployment, the TRPs in the first zone and the TRPs in the second zone may be associated with different controlling nodes. In this case the signalling exchange between the controlling node 321 and the TRPs in the second zone represented in FIG. 4 may in effect take place via the controlling node for the TRPs in the second zone. Furthermore, it will be appreciated the same approach can be applied in respect of a more conventional base-station based network architecture of the kind represented in FIG. 1. In this regard, an approach similar to that set out in FIG. 4 may be adopted with the functionality of the left two nodes in FIG. 4 (the controlling node 321 and TRPs in zone 1) being provided by one of the base stations 101 in the architecture of FIG. 1, and the functionality of the third-to-left node in FIG. 4 (the TRPs in zone 2) being provided by another of the base stations 101.

For deployments based on different zones of transceiver entities being associated with different uplink reference signalling configurations (e.g. as in the example represented in FIGS. 3 and 4), the sizes of the respective uplink zones may in some cases be relatively large (for example covering entire cities or districts, or covering a train line between stations), and so the need to reconfigure a terminal device's uplink reference signalling may in some deployments arise relatively infrequently.

Furthermore, for deployments based on different zones of transceiver entities being associated with different uplink reference signalling configurations, rather than configure a terminal device to transmit separate uplink signalling in accordance with different configurations for the two zones of transceiver entities, in some approaches a single "common" configuration may be adopted for use in regions between neighbouring zones. That is to say, transceiver entities in one zone which are in the vicinity of a boundary between two zones may be configured to receive uplink reference signalling in accordance with both a configuration that is specific to their zone (a "zone-wide" configuration) and a configuration which is defined for use at the boundary between zones (a "zone edge" configuration) which transceiver entities in the other zone at the boundary can also receive (i.e. neighbouring zones may have different "zone-wide" configurations but the same "zone-edge" configuration). Thus, when it is determined a terminal device is approaching the boundary between two zones, the terminal device may be configured to use the "zone edge" (i.e. "boundary") configuration which may be received by transceiver entities at the boundary of both zones, rather than transmit separate uplink reference signalling in accordance with different configurations associated with the respective zones. When such a terminal device moves away from the boundary, it may be reconfigured to use the relevant "zone-wide" configuration.

Thus there has been described a method of operating network infrastructure equipment in a wireless telecommunications network comprising the network infrastructure equipment and a terminal device, wherein the terminal device is operable to transmit uplink reference signalling to support measurements of radio channel conditions between the terminal device and the network infrastructure equipment, wherein the method comprises: receiving, from the terminal device, uplink reference signalling in accordance with a first uplink reference signalling configuration; determining the terminal device should be configured to transmit uplink reference signalling in accordance with a second uplink reference signalling configuration; and transmitting a paging message for the terminal device, wherein the paging message comprises an indication of an identifier for the terminal device and an indication of the second uplink reference signalling configuration.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating network infrastructure equipment in a wireless telecommunications network comprising the network infrastructure equipment and a terminal device, wherein the terminal device is operable to transmit uplink reference signalling to support measurements of radio channel conditions between the terminal device and the network infrastructure equipment, wherein the method comprises: receiving, from the terminal device, uplink reference signalling in accordance with a first uplink reference signalling configuration; determining the terminal device should be configured to transmit uplink reference signalling in accordance with a second uplink reference signalling configuration; and transmitting a paging message for the terminal device, wherein the paging message comprises an indication of an identifier for the terminal device and an indication of the second uplink reference signalling configuration.

Paragraph 2. The method of paragraph 1, wherein the network infrastructure equipment comprises a first group of one or more radio transceiver entities operable to make radio measurements of radio channel conditions between themselves and the terminal device using uplink reference signalling transmitted by the terminal device in accordance with the first uplink reference signalling configuration, and wherein the wireless telecommunications network further comprises a second group of one or more radio transceiver entities operable to make radio measurements of radio channel conditions between themselves and the terminal device using uplink reference signalling transmitted by the terminal device in accordance with the second uplink reference signalling configuration, and wherein the step of determining the terminal device should be configured to transmit uplink reference signalling in accordance with a second uplink reference signalling configuration comprises determining the terminal device has moved into communication range of one or more transceiver entities in the second group.

Paragraph 3. The method of paragraph 2, wherein the paging message for the terminal device further comprises an indication of a characteristic of downlink reference signalling transmitted by one or more of the transceiver entities in the second group.

Paragraph 4. The method of paragraph 2 or 3, wherein the uplink reference signalling transmitted by the terminal device in accordance with the second uplink reference signalling configuration is transmitted on a frequency which is outside a range of frequencies on which the first group of one or more radio transceiver entities are configured to operate.

Paragraph 5. The method of any preceding paragraph, wherein the paging message comprises an indication the terminal device should transmit uplink reference signalling in accordance with the second uplink reference signalling configuration in addition to uplink reference signalling in accordance with the first uplink reference signalling configuration.

Paragraph 6. The method of any preceding paragraph, wherein the paging message comprises an indication the terminal device should transmit uplink reference signalling in accordance with the second uplink reference signalling configuration instead of uplink reference signalling in accordance with the first uplink reference signalling configuration.

Paragraph 7. The method of any preceding paragraph, wherein the first uplink reference signalling configuration is associated with a first setting for an uplink reference signalling characteristic and the second uplink reference signalling configuration is associated with a second setting for the uplink reference signalling characteristic.

Paragraph 8. The method of paragraph 7, wherein the uplink reference signalling characteristic comprises an uplink reference signalling signature sequence for the terminal device to use when transmitting the uplink reference signalling.

Paragraph 9. The method of paragraph 7 or 8, wherein the uplink reference signalling characteristic comprises an identifier for the terminal device for the terminal device to use when transmitting the uplink reference signalling.

Paragraph 10. The method of any of paragraphs 7 to 9, wherein the uplink reference signalling characteristic comprises a transmission power setting for the terminal device to use when transmitting the uplink reference signalling.

Paragraph 11. The method of any of paragraphs 7 to 10, wherein the uplink reference signalling characteristic comprises an indication of a rate at which uplink reference signalling should be transmitted.

Paragraph 12. The method of any of paragraphs 7 to 11, wherein the uplink reference signalling characteristic comprises an indication of a transmission beam direction and/or a transmission beam sweep property for the terminal device to use when transmitting the uplink reference signalling.

Paragraph 13. The method of any of paragraphs 7 to 12, wherein the uplink reference signalling characteristic comprises radio resources for the terminal device to use when transmitting the uplink reference signalling.

Paragraph 14. The method of any of paragraphs 7 to 13, wherein the uplink reference signalling characteristic comprises an uplink channel configuration for the terminal device to use when transmitting the uplink reference signalling.

Paragraph 15. The method of any preceding paragraph, wherein the indication of the second uplink reference signalling configuration comprises an indication of one of plurality of predefined uplink reference signalling configurations for the terminal device to use for the second uplink reference signalling configuration.

Paragraph 16. The method of any preceding paragraph, wherein the network infrastructure equipment comprises a controller entity and a plurality or transceiver entities which are remote from the controller entity.

Paragraph 17. The method of any preceding paragraph, wherein the network infrastructure equipment comprises a controller entity and a transceiver entity co-located with the controller entity.

Paragraph 18. Network infrastructure equipment for use in a wireless telecommunications network comprising the network infrastructure equipment and a terminal device, wherein the terminal device is operable to transmit uplink reference signalling to support measurements of radio channel conditions between the terminal device and the network infrastructure equipment, wherein the radio network infrastructure element comprises controller circuitry and transceiver circuitry configured to operate together such that the radio network infrastructure element is operable to: receive, from the terminal device, uplink reference signalling in accordance with a first uplink reference signalling configuration; determine the terminal device should be configured to transmit uplink reference signalling in accordance with a second uplink reference signalling configuration; and transmit a paging message for the terminal device, wherein the paging message comprises an indication of an identifier for the terminal device and an indication of the second uplink reference signalling configuration.

Paragraph 19. Circuitry for network infrastructure equipment for use in a wireless telecommunications network comprising the network infrastructure equipment and a terminal device, wherein the terminal device is operable to transmit uplink reference signalling to support measurements of radio channel conditions between the terminal device and the network infrastructure equipment, wherein the circuitry comprises controller circuitry and transceiver circuitry configured to operate together such that the circuitry is operable to: receive, from the terminal device, uplink reference signalling in accordance with a first uplink reference signalling configuration; determine the terminal device should be configured to transmit uplink reference signalling in accordance with a second uplink reference signalling configuration; and transmit a paging message for the terminal device, wherein the paging message comprises an indication of an identifier for the terminal device and an indication of the second uplink reference signalling configuration.

Paragraph 20. A method of operating a terminal device in a wireless telecommunications network comprising the terminal device and network infrastructure equipment, wherein the terminal device is operable to transmit uplink reference signalling to support measurements of radio channel conditions between the terminal device and the network infrastructure equipment, wherein the method comprises: transmitting uplink reference signalling in accordance with a first uplink reference signalling configuration; receiving, from the network infrastructure equipment, a paging message comprising an indication of an identifier for the terminal device and an indication of a second uplink reference signalling configuration; and transmitting uplink reference signalling in accordance with the second uplink reference signalling configuration.

Paragraph 21. A terminal device for use in a wireless telecommunications network comprising the terminal device and network infrastructure equipment, wherein the terminal device is operable to transmit uplink reference signalling to support measurements of radio channel conditions between the terminal device and the network infrastructure equipment, wherein the terminal device comprises controller circuitry and transceiver circuitry configured to operate together such that the terminal device is operable to: transmit uplink reference signalling in accordance with a first uplink reference signalling configuration; receive, from the network infrastructure equipment, a paging message comprising an indication of an identifier for the terminal device and an indication of a second uplink reference signalling configuration; and transmit uplink reference signalling in accordance with the second uplink reference signalling configuration.

Paragraph 22. Circuitry for a terminal device for use in a wireless telecommunications network comprising the terminal device and network infrastructure equipment, wherein the terminal device is operable to transmit uplink reference signalling to support measurements of radio channel conditions between the terminal device and the network infrastructure equipment, wherein the circuitry comprises controller circuitry and transceiver circuitry configured to operate together such that the circuitry is operable to: transmit uplink reference signalling in accordance with a first uplink reference signalling configuration; receive, from the network infrastructure equipment, a paging message comprising an indication of an identifier for the terminal device and an indication of a second uplink reference signalling configuration; and transmit uplink reference signalling in accordance with the second uplink reference signalling configuration.

REFERENCES

[1] 3GPP document RP-160671, "New SID Proposal: Study on New Radio Access Technology," NTT DOCOMO, RAN #71, Gothenburg, Sweden, 7 to 10. March, 2016
[2] Holma H. and Toskala A, "LTE for UMTS OFDMA and SC-FDMA based radio access", John Wiley and Sons, 2009
[3] ETSI TS 136 321 V13.0.0 (2016 February)/3GPP TS 36.321 version 13.0.0 Release 13
[4] "New WI proposal: Signalling reduction to enable light connection for LTE", 3GPP TSG RAN Meeting #71, RP-160540, Gothenburg, Sweden, 7-10 Mar. 2016
[5] "Text Proposal to TR 38.804 on UE states and state transitions for NR", 3GPP TSG-RAN WG2 #96, R2-168856, 14-18 Nov. 2016
[6] "Evaluation on RAN initiated paging and MME initiated paging", 3GPP TSG-RAN WG2 Meeting #94, R2-163930, Nanjing, China, 23-27 May, 2016
[7] "RAN based Update mechanism for new RAN state", 3GPP TSG RAN WG2 Meeting #96, R2-168525, Reno, USA, 14-18 Nov. 2016
[8] "Discussion on RAN notification area for the new RRC state" 3GPP TSG RAN WG2 Meeting #96, R2-168524, Reno, USA, 14-18 Nov. 2016
[9] "Inactive State principles—RAN based notification area", 3GPP TSG RAN WG2 Meeting #96, R2-168602, Reno, USA, 14-18 Nov. 2016
[10] "Proposed Way Forward on Uplink-Based Mobility", 3GPP TSG-RAN WG2 Meeting #95bis, R2-167286, Kaohsiung, 10-14 Oct. 2016
[11] "NR uplink measurement based mobility in the inactive state" 3GPP TSG-RAN WG2 Meeting #95bis, R2-167066, Kaohsiung, 10-14 Oct. 2016
[12] "Benefit of UL tracking" 3GPP TSG-RAN WG2 Meeting #95bis, R2-166987, Kaohsiung, 10-14 Oct. 2016
[13] "Energy conserved operation evaluation", 3GPP TSG-RAN WG2 Meeting #95bis, R2-166907, Kaohsiung, 10-14 Oct. 2016

What is claimed is:

1. A method of operating network infrastructure equipment in a wireless telecommunications network comprising the network infrastructure equipment and a terminal device, wherein the terminal device is operable to transmit uplink reference signalling to support measurements of radio channel conditions between the terminal device and the network infrastructure equipment, wherein the method comprises:
receiving, from the terminal device, uplink reference signalling in accordance with a first uplink reference signalling configuration;
determining the terminal device should be configured to transmit uplink reference signalling in accordance with a second uplink reference signalling configuration; and
transmitting a paging message for the terminal device, wherein the paging message is transmitted in a dedicated paging frame and comprises an indication of an identifier for the terminal device and an indication of the second uplink reference signalling configuration.

2. The method of claim 1, wherein the paging message comprises an indication the terminal device should transmit uplink reference signalling in accordance with the second uplink reference signalling configuration in addition to uplink reference signalling in accordance with the first uplink reference signalling configuration.

3. The method of claim 1, wherein the paging message comprises an indication the terminal device should transmit uplink reference signalling in accordance with the second uplink reference signalling configuration instead of uplink reference signalling in accordance with the first uplink reference signalling configuration.

4. The method of claim 1, wherein the first uplink reference signalling configuration is associated with a first setting for an uplink reference signalling characteristic and the second uplink reference signalling configuration is associated with a second setting for the uplink reference signalling characteristic.

5. The method of claim 4, wherein the uplink reference signalling characteristic comprises an uplink reference signalling signature sequence for the terminal device to use when transmitting the uplink reference signalling.

6. The method of claim 4, wherein the uplink reference signalling characteristic comprises an identifier for the terminal device for the terminal device to use when transmitting the uplink reference signalling.

7. The method of claim 4, wherein the uplink reference signalling characteristic comprises a transmission power setting for the terminal device to use when transmitting the uplink reference signalling.

8. The method of claim 4, wherein the uplink reference signalling characteristic comprises an indication of a rate at which uplink reference signalling should be transmitted.

9. The method of claim 4, wherein the uplink reference signalling characteristic comprises an indication of a transmission beam direction and/or a transmission beam sweep property for the terminal device to use when transmitting the uplink reference signalling.

10. The method of claim 4, wherein the uplink reference signalling characteristic comprises radio resources for the terminal device to use when transmitting the uplink reference signalling.

11. The method of claim 4, wherein the uplink reference signalling characteristic comprises an uplink channel configuration for the terminal device to use when transmitting the uplink reference signalling.

12. The method of claim 1, wherein the indication of the second uplink reference signalling configuration comprises an indication of one of plurality of predefined uplink reference signalling configurations for the terminal device to use for the second uplink reference signalling configuration.

13. The method of claim 1, wherein the network infrastructure equipment comprises a controller entity and a plurality or transceiver entities which are remote from the controller entity.

14. The method of claim 1, wherein the network infrastructure equipment comprises a controller entity and a transceiver entity co-located with the controller entity.

15. A method of operating network infrastructure equipment in a wireless telecommunications network comprising the network infrastructure equipment and a terminal device, wherein the terminal device is operable to transmit uplink reference signalling to support measurements of radio channel conditions between the terminal device and the network infrastructure equipment, wherein the method comprises:

receiving, from the terminal device, uplink reference signalling in accordance with a first uplink reference signalling configuration;

determining the terminal device should be configured to transmit uplink reference signalling in accordance with a second uplink reference signalling configuration; and transmitting a paging message for the terminal device, wherein the paging message comprises an indication of an identifier for the terminal device and an indication of the second uplink reference signalling configuration, wherein the network infrastructure equipment comprises a first group of one or more radio transceiver entities operable to make radio measurements of radio channel conditions between themselves and the terminal device using uplink reference signalling transmitted by the terminal device in accordance with the first uplink reference signalling configuration, and wherein the wireless telecommunications network further comprises a second group of one or more radio transceiver entities operable to make radio measurements of radio channel conditions between themselves and the terminal device using uplink reference signalling transmitted by the terminal device in accordance with the second uplink reference signalling configuration, and wherein the step of determining the terminal device should be configured to transmit uplink reference signalling in accordance with a second uplink reference signalling configuration comprises determining the terminal device has moved into communication range of one or more transceiver entities in the second group.

16. The method of claim 15, wherein the paging message for the terminal device further comprises an indication of a characteristic of downlink reference signalling transmitted by one or more of the transceiver entities in the second group.

17. The method of claim 15, wherein the uplink reference signalling transmitted by the terminal device in accordance with the second uplink reference signalling configuration is transmitted on a frequency which is outside a range of frequencies on which the first group of one or more radio transceiver entities are configured to operate.

18. Network infrastructure equipment for use in a wireless telecommunications network comprising the network infrastructure equipment and a terminal device, wherein the terminal device is operable to transmit uplink reference signalling to support measurements of radio channel conditions between the terminal device and the network infrastructure equipment, wherein the radio network infrastructure element comprises controller circuitry and transceiver circuitry configured to operate together such that the radio network infrastructure element is operable to:

receive, from the terminal device, uplink reference signalling in accordance with a first uplink reference signalling configuration;

determine the terminal device should be configured to transmit uplink reference signalling in accordance with a second uplink reference signalling configuration; and transmit a paging message for the terminal device, wherein the paging message is transmitted in a dedicated paging frame and comprises an indication of an identifier for the terminal device and an indication of the second uplink reference signalling configuration.

19. A terminal device for use in a wireless telecommunications network comprising the terminal device and network infrastructure equipment, wherein the terminal device is operable to transmit uplink reference signalling to support measurements of radio channel conditions between the terminal device and the network infrastructure equipment, wherein the terminal device comprises controller circuitry and transceiver circuitry configured to operate together such that the terminal device is operable to:
- transmit uplink reference signalling in accordance with a first uplink reference signalling configuration;
- receive, from the network infrastructure equipment in a dedicated paging frame, a paging message comprising an indication of an identifier for the terminal device and an indication of a second uplink reference signalling configuration; and
- transmit uplink reference signalling in accordance with the second uplink reference signalling configuration.

* * * * *